US010052744B2

(12) United States Patent
Hacker et al.

(10) Patent No.: US 10,052,744 B2
(45) Date of Patent: Aug. 21, 2018

(54) FIXTURE FOR SUPPORTING A WORKPIECE

(75) Inventors: Brian F. Hacker, Williamston, MI (US); Gregory J. Tomkiewicz, Milford, MI (US); Claudio Giorda, Turin (IT); Giuseppe Urso, Turin (IT)

(73) Assignees: GM Global Technology Operations LLC, Detroit, MI (US); Comau LLC, Southfield, MI (US)

( * ) Notice: Subject to any disclaimer, the term of this patent is extended or adjusted under 35 U.S.C. 154(b) by 2009 days.

(21) Appl. No.: 13/329,948

(22) Filed: Dec. 19, 2011

(65) Prior Publication Data

US 2012/0175832 A1  Jul. 12, 2012

Related U.S. Application Data

(60) Provisional application No. 61/431,417, filed on Jan. 10, 2011.

(51) Int. Cl.
| | |
|---|---|
| *B23Q 1/00* | (2006.01) |
| *B25B 5/08* | (2006.01) |
| *B25B 5/06* | (2006.01) |
| *B25B 11/00* | (2006.01) |
| *B23B 11/00* | (2006.01) |

(52) U.S. Cl.
CPC .............. *B25B 11/00* (2013.01); *B23B 11/00* (2013.01); *B23Q 1/009* (2013.01); *B23Q 1/0072* (2013.01); *B23Q 1/0081* (2013.01); *B25B 5/061* (2013.01); *B25B 5/087* (2013.01); *Y10T 29/49998* (2015.01)

(58) Field of Classification Search
CPC ......... B25B 5/061; B25B 5/064; B25B 5/087; B25B 5/122; B25B 11/02; B25B 11/00; B23Q 1/009; B23Q 1/0072; B23Q 1/0081; Y10T 29/49998
USPC .......... 269/24, 27, 289 R, 291, 53, 311, 48.1, 269/252, 309–310, 32; 29/559
See application file for complete search history.

(56) References Cited

U.S. PATENT DOCUMENTS

| | | | | |
|---|---|---|---|---|
| 2,008 | A | * | 3/1841 | Cornelius ....................... 285/11 |
| 3,565,416 | A | * | 2/1971 | Williamson et al. ........... 269/47 |
| 3,638,934 | A | * | 2/1972 | Blum et al. .................... 269/311 |

(Continued)

FOREIGN PATENT DOCUMENTS

| | | |
|---|---|---|
| CN | 201136101 Y | 10/2008 |
| CN | 101618514 A | 1/2010 |

(Continued)

OTHER PUBLICATIONS

Marghitu, Dan B.. (2001). Mechanical Engineers Handbook—8.2.4 Pressure Intensifiers.*

(Continued)

*Primary Examiner* — Christopher M Koehler
*Assistant Examiner* — Mahdi H Nejad
(74) *Attorney, Agent, or Firm* — Quinn IP Law

(57) ABSTRACT

A fixture for holding a workpiece includes clamps configured to engage tie rods secured to the workpiece, locating pins configured to engage a corresponding pin secured to the workpiece, pads, and actuators configured to move clamps for alternately drawing the workpiece into contact with the pads and disengaging the tie rod from the clamp such that the fixture assembly can release the workpiece.

18 Claims, 5 Drawing Sheets

(56) References Cited

U.S. PATENT DOCUMENTS

| | | | |
|---|---|---|---|
| 3,782,847 A | 1/1974 | Kulzer | |
| 4,191,366 A | 3/1980 | Rabin | |
| 4,393,674 A * | 7/1983 | Rasmussen | B21D 26/041 279/2.03 |
| 4,583,631 A | 4/1986 | Yonezawa et al. | |
| 4,932,642 A * | 6/1990 | Salenbien | B23B 31/02 269/133 |
| 5,255,901 A | 10/1993 | Rottler | |
| 5,810,344 A * | 9/1998 | Nishimoto | B23B 31/1071 269/309 |
| 5,944,303 A | 8/1999 | Reed | |
| 6,024,354 A * | 2/2000 | Yonezawa | B23Q 1/0081 269/309 |
| 6,094,793 A | 8/2000 | Szuba | |
| 6,095,509 A * | 8/2000 | Yonezawa | 269/309 |
| 6,145,824 A * | 11/2000 | Stark | B23Q 1/0018 269/20 |
| 6,241,228 B1 * | 6/2001 | Chupick | B23Q 1/009 269/311 |
| 6,371,469 B1 * | 4/2002 | Gray | B23Q 3/068 269/234 |
| 6,378,855 B1 * | 4/2002 | Sawdon et al. | 269/32 |
| 6,412,763 B1 * | 7/2002 | Noda | B25B 5/062 269/24 |
| 6,527,266 B1 * | 3/2003 | Yonezawa | B23Q 1/0081 269/309 |
| 6,619,646 B2 * | 9/2003 | Yonezawa | B25B 5/061 269/309 |
| 6,622,988 B2 * | 9/2003 | Gill | A47G 21/185 220/703 |
| 6,637,737 B1 | 10/2003 | Beeched et al. | |
| 6,644,637 B1 | 11/2003 | Shen et al. | |
| 6,712,348 B1 | 3/2004 | Kramarczyk et al. | |
| 6,877,729 B2 | 4/2005 | Lin et al. | |
| 7,108,255 B2 * | 9/2006 | Zajac et al. | 269/32 |
| 7,144,002 B2 * | 12/2006 | Zhao et al. | 269/32 |
| 7,188,832 B2 * | 3/2007 | Kita et al. | 269/32 |
| 7,311,301 B2 * | 12/2007 | Liu et al. | 269/32 |
| 7,618,030 B2 * | 11/2009 | Yonezawa | F15B 15/068 269/24 |
| 7,669,840 B2 * | 3/2010 | Xu et al. | 269/32 |
| 7,793,924 B2 * | 9/2010 | Yonezawa | B23Q 3/183 269/309 |
| 8,256,755 B2 * | 9/2012 | Hiromatsu | 269/238 |
| 8,517,360 B2 * | 8/2013 | Kawakami | B23Q 1/009 269/20 |
| 8,613,434 B2 * | 12/2013 | Kitaura et al. | 269/313 |
| 8,967,604 B2 * | 3/2015 | Fleischer | 269/32 |
| 8,985,564 B2 * | 3/2015 | Stanifer et al. | 269/32 |
| 8,998,191 B2 * | 4/2015 | Gao et al. | 269/289 R |
| 2003/0146556 A1 * | 8/2003 | Phillips | B23Q 16/001 269/310 |
| 2004/0021260 A1 * | 2/2004 | Migliori | 269/32 |
| 2004/0159996 A1 * | 8/2004 | Migliori | 269/32 |
| 2005/0012258 A1 * | 1/2005 | Migliori | 269/32 |
| 2005/0017424 A1 * | 1/2005 | Migliori | 269/32 |
| 2005/0029728 A1 * | 2/2005 | Kuroda | B23Q 16/00 269/309 |
| 2005/0121846 A1 * | 6/2005 | Kawakami | 269/309 |
| 2006/0049565 A1 * | 3/2006 | Petit et al. | 269/32 |
| 2006/0049568 A1 * | 3/2006 | Yonezawa | B23B 31/402 269/309 |
| 2006/0202401 A1 * | 9/2006 | Shinozaki | B23Q 1/035 269/27 |
| 2007/0170630 A1 * | 7/2007 | Kuroda | B23Q 1/009 269/309 |
| 2013/0113146 A1 * | 5/2013 | Kawakami | B23Q 1/009 269/25 |
| 2014/0117604 A1 * | 5/2014 | Lim | B23Q 1/009 269/48.1 |

FOREIGN PATENT DOCUMENTS

| | | | |
|---|---|---|---|
| DE | 4307342 A1 | 9/1994 | |
| WO | WO2009130854 | * 10/2009 | B23Q 3/06 |

OTHER PUBLICATIONS

Provisional Drawings in U.S. Appl. No. 61/431,417, filed Jan. 10, 2011.*

* cited by examiner

FIXTURE FOR SUPPORTING A WORKPIECE

CROSS REFERENCE TO RELATED APPLICATIONS

This application claims priority to and the benefit of U.S. Provisional Application No. 61/431,417, filed Jan. 10, 2011, the full disclosure of which is incorporated herein by reference.

BACKGROUND OF INVENTION

The present invention relates generally to fixturing for holding a workpiece while performing manufacturing operations on the workpiece.

Holding a workpiece and positioning it accurately while machining the workpiece performing multiple operations on it is challenging. This is especially true when tools used to process a complex-shaped workpiece must access the workpiece from multiple sides. For example, a cylinder head for an internal combustion engine may need to have operations performed that required access to several sides for multiple different operations to be performed on the head.

Attempts have been made to machine and perform manufacturing processing on these types of workpieces by attaching adapter plates to the workpiece and then supporting the adapter plate. However, these processes can be costly and may require extensive part features to be designed into the workpiece, such as a cylinder head.

SUMMARY OF INVENTION

A fixture for holding a workpiece includes clamps able to engage tie rods secured to the workpiece, locating pins able to engage a corresponding pin secured to the workpiece, pads, and actuators able to move clamps for alternately drawing the workpiece into contact with the pads and disengaging the tie rod from the clamp such that the fixture assembly can release the workpiece.

A method applicable to the fixture for holding the workpiece includes securing a tie rod to the workpiece, providing a fixture that includes a pad and a clamp able to engage the tie rod, moving the tie rod into the clamp, forcing the clamp into engagement with the tie rod, and drawing the workpiece into contact with the pad.

An advantage of an embodiment is that the fixture incorporates a non-deck face manufacturing location, yet renders a machined part that is essentially machined from the desired deck face. The fixturing allows for access to five faces of a cylinder head for manufacturing operations to be performed on the head. The number of clamping positions can be minimized, resulting in fewer loads and unloads of the component, and thus a fewer number of manufacturing operations. The access to five faces of a cylinder head may also allow for reduced tool length for tools used to process the head, and may improve tolerances in the finished parts.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DETAILED DESCRIPTION

Figure 1:
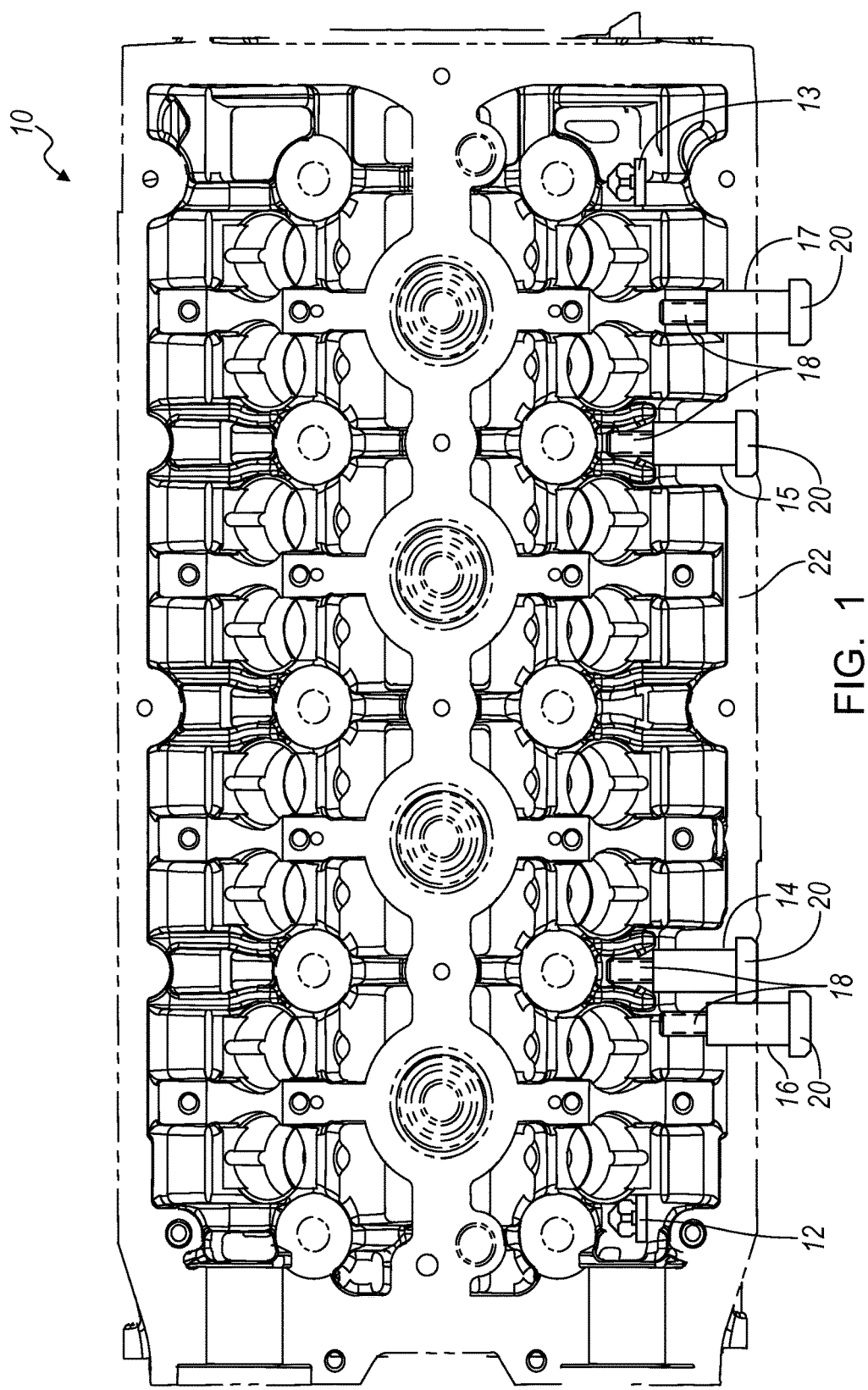
FIGS. 1 and 2 are a plan view and a side view, respectively, of a cylinder head for an internal combustion engine showing tie rods and locating pins engaged with the cylinder head.
Figure 2:
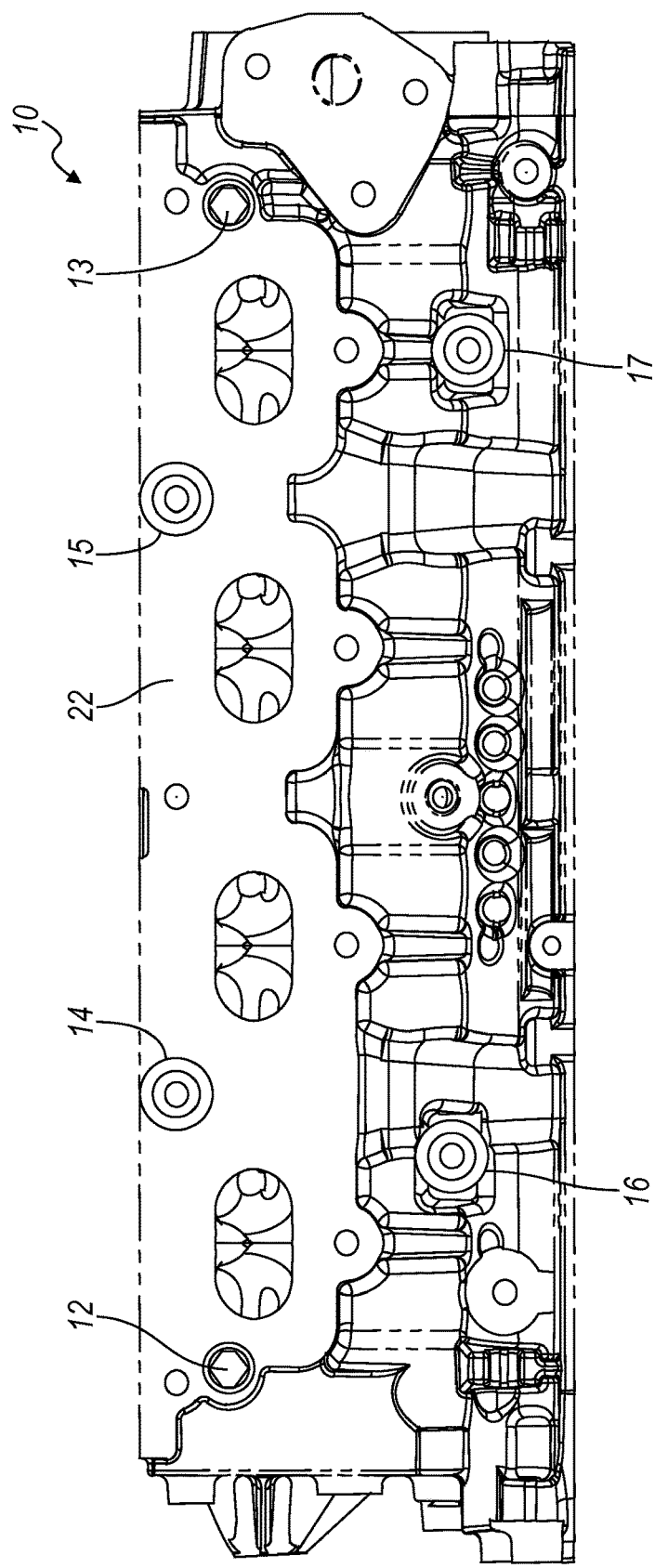

Referring to FIGS. 1 and 2, a cylinder head 10 for an internal combustion engine (not shown) includes locating pins 12, 13, formed with concave surfaces, and threaded bores for receiving tie rods 14, 15, 16, 17. A threaded shank 18 of each tie rod 14-17 is engaged with the threaded bores formed in the cylinder head 10. The head 20 of each tie rod extends outward from the exhaust face 22 of the cylinder head 10 and is sized and shaped to be received and selectively retained in a fixture assembly. Each tie rod 14-17 includes a cylindrical shank, located between the threaded shank 18 and the head 10, the cylindrical shank extending mutually parallel to the cylindrical shanks of the other tie rods and perpendicular to the exhaust face 22.

Figure 3:
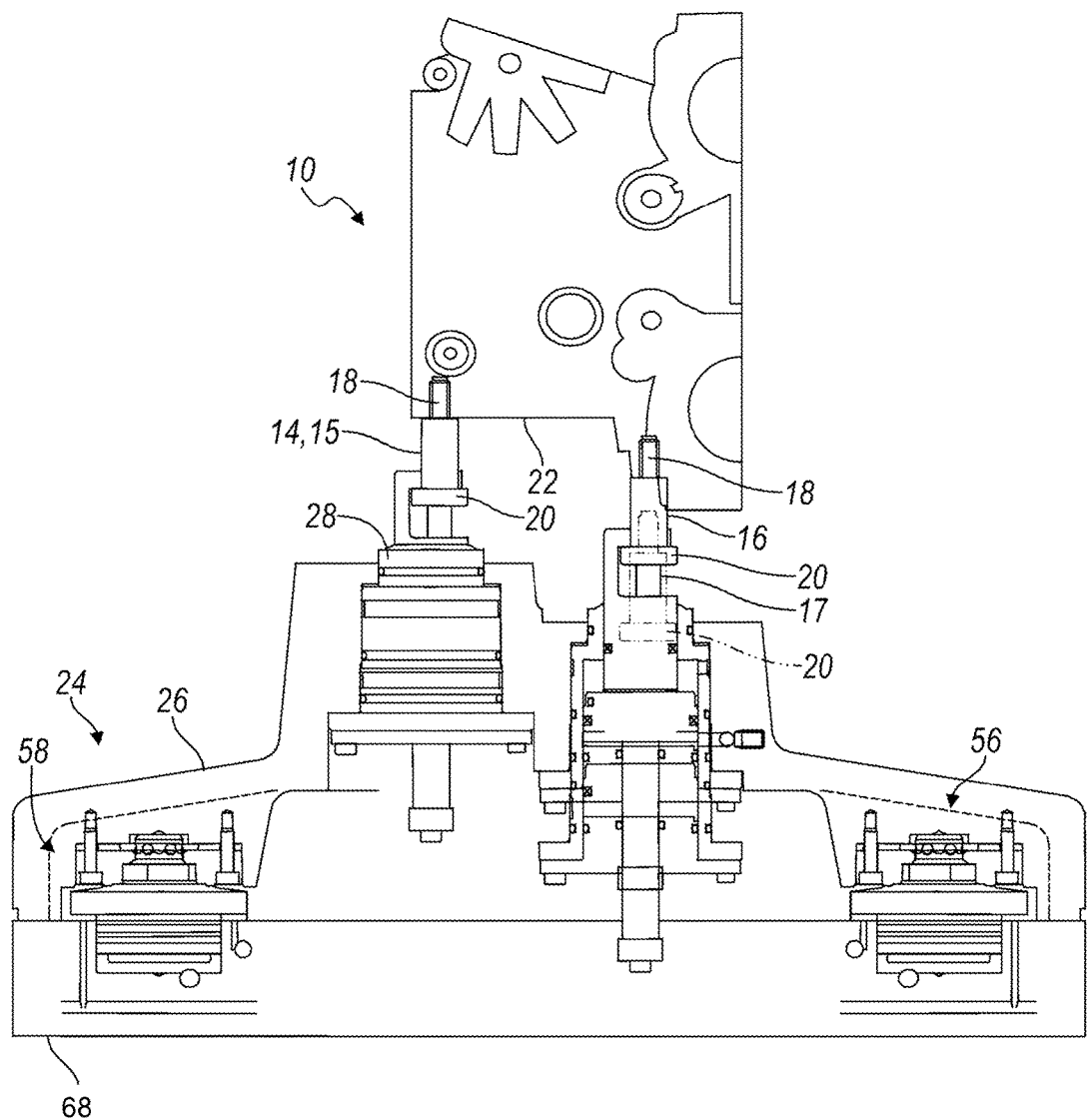
FIG. 3 is a side view of a fixture assembly supporting the cylinder head and including clamping cartridges engaging the tie rods.
Figure 4:
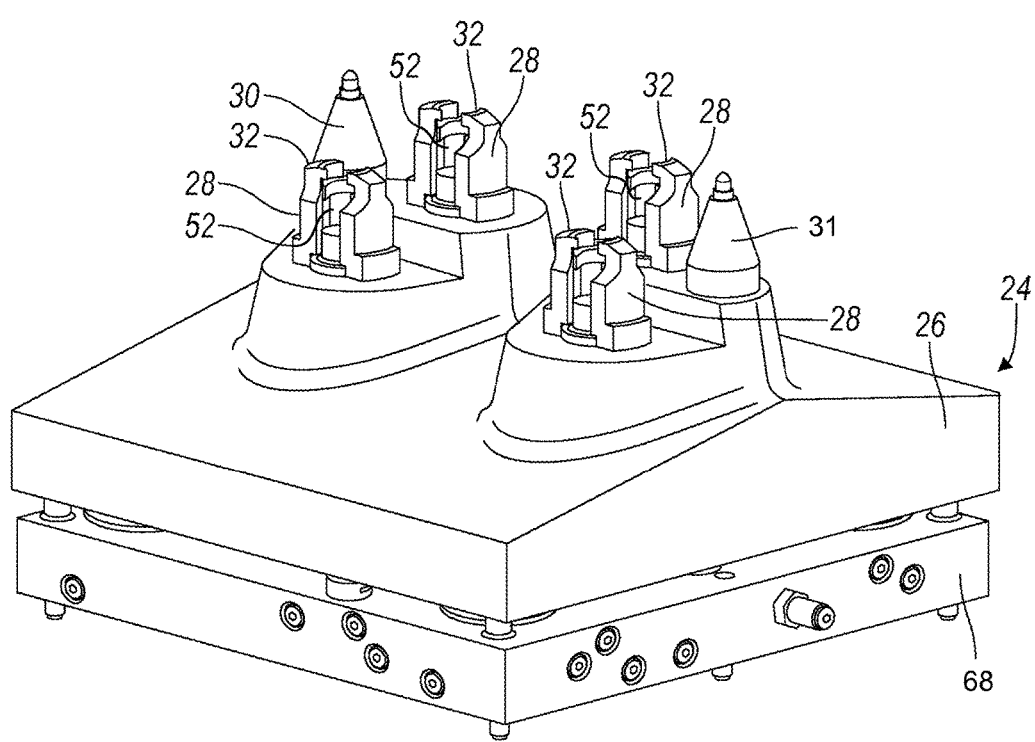
FIG. 4 is perspective view of the fixture.

FIGS. 3 and 4 show a fixture assembly 24 comprising an upper, quick connect (QC) fixture 26, which includes four clamping cartridges 28, each cartridge engaged with the head 20 of each tie rod 14-17, a locating pin 30 having a convex surface facing the cylinder head for engaging the concave locating pin 12 on the exhaust face 22, and a locating pin 31 having a convex surface facing the cylinder head for engaging the concave locating pin 13 on the exhaust face 22.

Figure 5:
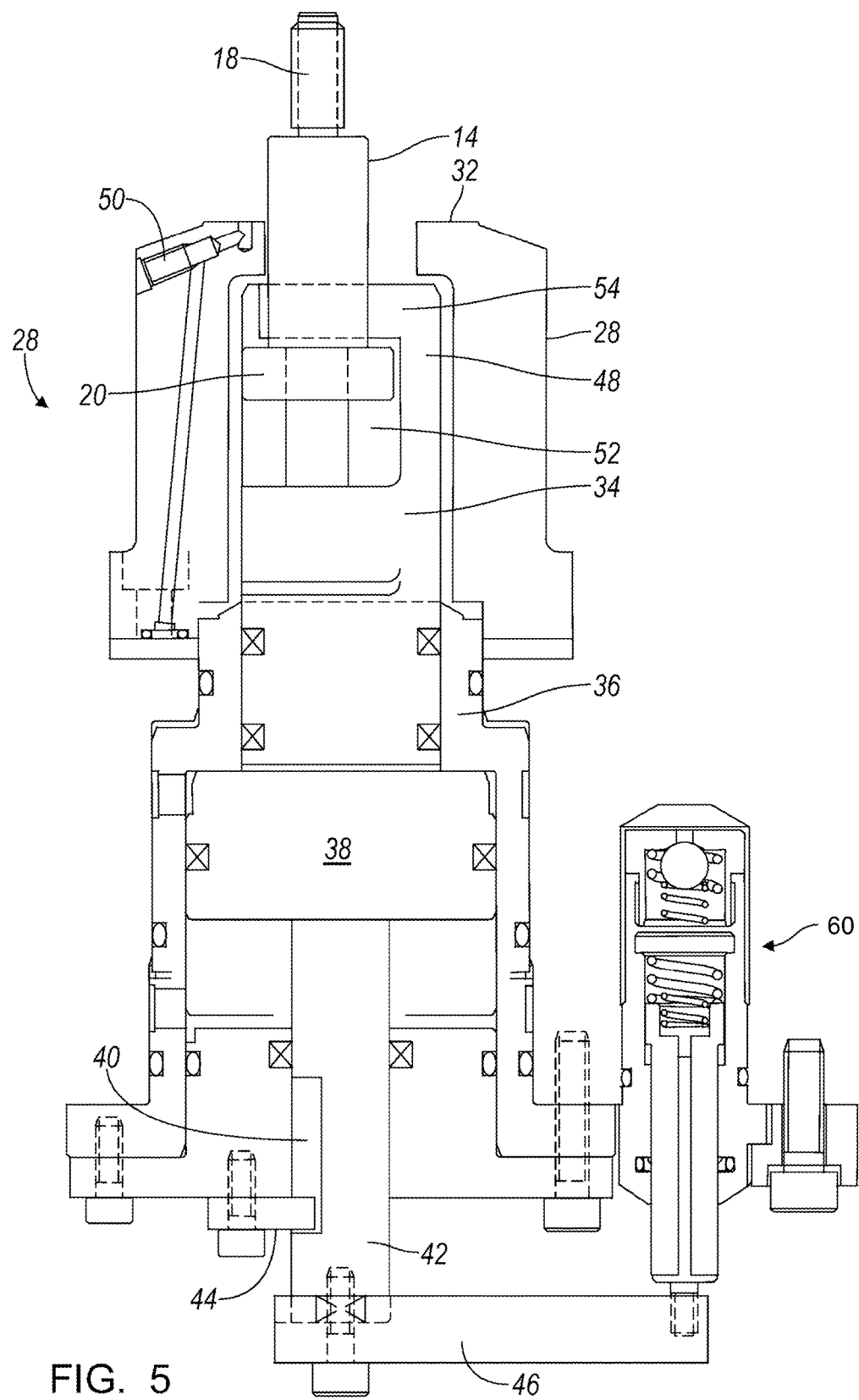
FIG. 5 is a side view of a clamping cartridge engaged with one of the tie rods.

As FIG. 5 shows, each clamping cartridge 28 includes a rest pad 32 and a clamping device 34, located in a cylinder 36 and secured to a piston 38, which is also located in the cylinder. In FIG. 5 the clamping device 34 is located at the upper end of its travel where a recess 40, formed in a rod 42 connected to piston 38, contacts the lower surface of a stop 44. When the piston 38 is actuated downward to draw the cylinder head 10 into contact with the rest pad 32, the axially opposite surface of recess 40 contacts the upper surface of stop 44. Pressure supplied to each clamping cartridge 28 actuates piston 38 upward and downward through a plate 46.

Each clamping device 34 also includes a tie rod holder 48 or clamp bar, which engages the head 20 of one of the tie rods 14-17. The tie rod holders 48 and the rest pads 32 extend upward from the upper fixture 26. The rest pads 32 may also include a part landing detector 50, which detects when the cylinder head 10 is positioned properly relative to the upper fixture 26. An air check for cartridge 60 for unclamping may be included with the clamping cartridge 28. Each tie rod holder 48 includes a recess 52 for receiving the head 20 of a tie rod 14-17, and a retention lip 54, which engages the head 20 of the tie rod that is located in the recess 52. The tie rod holder 48 may include an internal passage that may be employed to blow out debris from the recess 52.

The upper fixture 26 also includes locating rings 56, 58 for positioning and securing the upper fixture to the lower fixture 68. The fixtures 26, 68 may also include quick couplers that connect between the two fixtures in order to allow for the flow of oil, coolant and air between the fixtures. The lower fixture 68 may include Pascal clamping devices, located near each of its corners, and pre-locators for ensuring proper location and securement. The lower fixture 68 may be mounted to a linear motor five-axis machine that allows for five axis machining of the cylinder head 10.

An RFID tag may also be mounted on the cylinder head 10 in order to allow for identification of each cylinder head as it is loaded into the fixture assembly.

To mount the cylinder block 10 on the fixture assembly 24, the tie rods 14-17 are oriented to extend from the cylinder block toward the upper fixture 26, as shown in FIG. 3. The tie rods 14-17 are located adjacent the openings to the recesses 52 in the tie rod holders 48. Each of the tie rods 14-17 is received in one of the recesses 52. The clamping device 34 of each clamping cartridge 28 is actuated to cause the retention lip 54 to engage the engagement head 20 of the respective tie rod 14-17 and to pull the tie rod toward the upper fixture 26 until the part landing detectors 50 on the rest pads 32 detect that each tie rod 14-17 is positioned as desired. The cylinder head 10 is then held firmly in the desired position for various operations, such as machining to be performed on the cylinder head 10. When finished, the clamping devices 34 are actuated to release the tie rods 14-17 from the fixture 24. The tie rods 14-17 may then be removed from the cylinder head 10.

The mounting of the cylinder head 10 on the fixture assembly 24 allows for access to five faces of the head 10. A semi-finish deck face and head-to-block dowels may be created in the same fixturing as rough end features. Finish end machining may be performed using the same concept. The deck face and dowels are completed at the same time as finish machining of all critical features of the head 10 is performed.

While particularly well suited for use with a cylinder head 10, this type of fixturing assembly may also be applied to other types of prismatic surfaces where access to multiple surfaces for machining is desired.

While certain embodiments of the present invention have been described in detail, those familiar with the art to which this invention relates will recognize various alternative designs and embodiments for practicing the invention as defined by the following claims.

What is claimed is:

1. A fixture for holding a workpiece, comprising:
   tie rods threadably engageable with the workpiece and having heads that are spaced from a face of the workpiece;
   clamps extending from the fixture toward the tie rods, each clamp configured to engage the corresponding head of the corresponding tie rod secured to the workpiece;
   tapered locating pins extending from the fixture, each locating pin configured to engage a corresponding pin secured to the workpiece;
   pads located outward farther from the fixture than the clamps; and
   actuators, each actuator configured to move one of the clamps, alternately drawing the face of the workpiece into contact with the pads and disengaging said tie rod from the clamp such that the fixture can release the workpiece with the tie rods still threadably engaging the workpiece.

2. The fixture of claim 1, wherein each clamp further comprises a tie rod holder formed with a recess able to receive the corresponding head of said tie rod.

3. The fixture of claim 2, wherein each of the clamps further comprises:

a retention lip able to overlap and engage the corresponding head of said tie rod;
a cylinder; and
a piston moveable in the cylinder and secured to the tire rod holder.

4. The fixture of claim 3, further comprising:
a source of pressured fluid connected to the cylinder for moving said clamp in opposite directions along a length of the cylinder.

5. The fixture of claim 1, wherein:
the piston is formed with a second recess and each clamp includes a stop that extends into the second recess and limits displacement of the piston due to contact between the stop and the second recess.

6. The fixture of claim 1, wherein:
each pin is formed with a concave recess, and
each locating pin is formed with a convex surface able to be received in the concave recess of the corresponding pin.

7. The fixture of claim 1, further comprising a second fixture releasably secured to the fixture on a side opposite from the clamps.

8. A fixture for holding a workpiece, comprising:
tie rods threadably engageable with the workpiece and having heads that are spaced from a face of the workpiece;
canisters extending from the fixture toward the tie rods, each canister formed with a pad and having an opening accessible to the corresponding tie rod secured to the workpiece;
clamps extending from the fixture toward the tie rods, each clamp located in the corresponding canister, engageable with the corresponding tie rod; and
actuators, each actuator configured to move one of the clamps, alternately drawing the face of the workpiece into contact with the corresponding pad and disengaging said tie rod from the clamp such that the fixture can release the workpiece with the tie rods still threadably engaging the workpiece.

9. The fixture of claim 8, further comprising locating pins extending from the fixture, and each of the locating pins configured to engage a corresponding pin secured to the workpiece.

10. The fixture of claim 9, wherein:
each of the pins is formed with a concave recess, and
each of the locating pins is formed with a convex surface configured to be received in the concave recess of the corresponding pin.

11. The fixture of claim 8, wherein each of the clamps further comprises:
a tie rod holder formed with a recess configured to receive the corresponding head of said tie rod after passing through the opening in the corresponding canister.

12. The fixture of claim 11, wherein each of the clamps further comprises:
a retention lip configured to overlap and engage the corresponding head of said tie rod;
a cylinder; and
a piston moveable in the cylinder and secured to the tire rod holder.

13. The fixture of claim 12, further comprising:
a source of pressured fluid connected to the cylinder for moving said clamp in opposite directions along a length of the cylinder.

14. The fixture of claim 8, wherein:
the piston is formed with a second recess and each of the clamps includes a stop that extends into the second recess and limits displacement of the piston due to contact between the stop and the second recess.

15. The fixture of claim 8, further comprising a second fixture releasably secured to the fixture on a side opposite from the clamps.

16. A method for holding a workpiece, comprising:
threading a tie rod to the workpiece, such that a head of the tie rod is spaced from a face of the workpiece;
providing a fixture that includes a pad and a clamp configured to engage the tie rod, the pad and the clamp extending from the fixture toward the tie rod;
moving the head of the tie rod into a recess of a tie rod holder in the clamp;
moving the clamp into engagement with the tie rod by moving the tie rod holder away from the workpiece; and
drawing the face of the workpiece into contact with the pad.

17. The method of claim 16, further comprising:
conducting fabrication operations on the workpiece while the face of the workpiece is held in contact with the pad;
after fabrication operations are conducted, disengaging the tie rod from the clamp while maintaining the tie rod threadably secured to the workpiece; and
releasing the fixture from the workpiece.

18. The method of claim 16, further comprising:
securing pins to the workpiece; and
using locating pins secured to the fixture to engage the pins on the workpiece before forcing the clamp into engagement with the tie rod.

* * * * *